M. W. SAPPINGTON & E. S. HORNBECK.
FRONT DRIVING AND STEERING MECHANISM FOR MOTOR VEHICLES.
APPLICATION FILED DEC. 14, 1911.
1,048,213.
Patented Dec. 24, 1912.
2 SHEETS—SHEET 2.
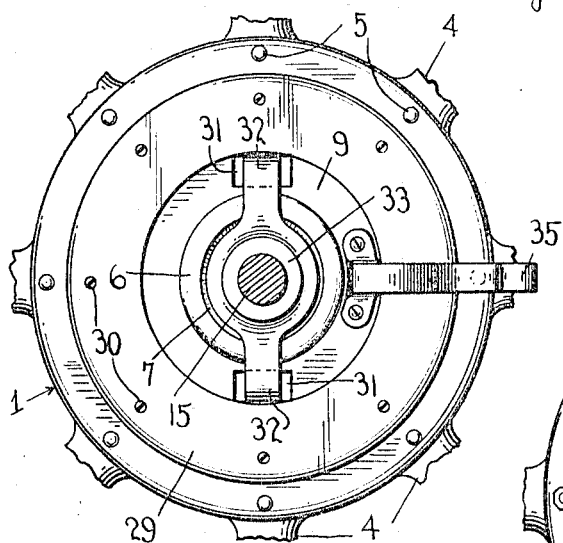
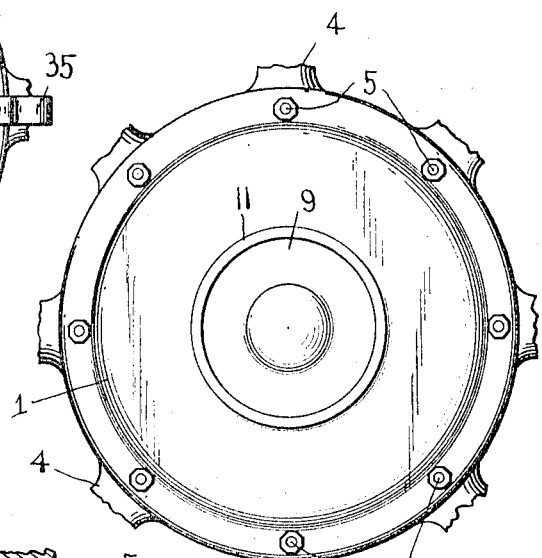
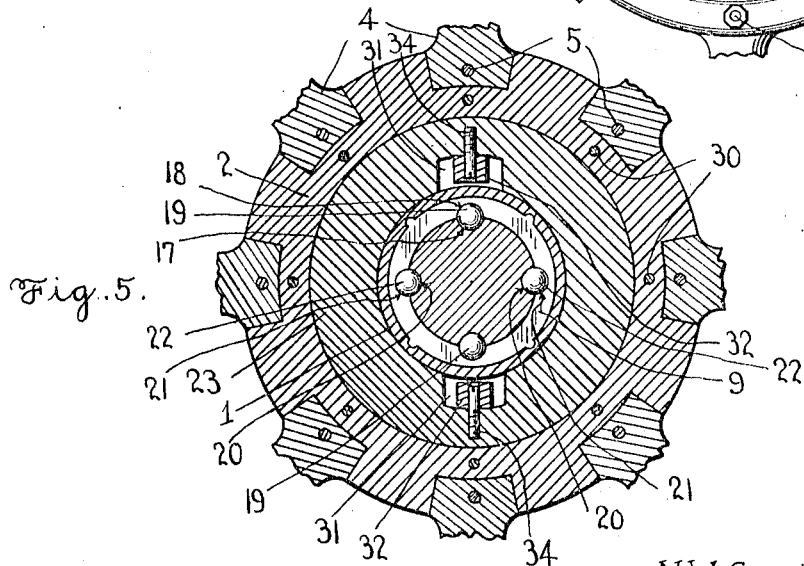
Inventors
M.W. Sappington
E.S. Hornbeck

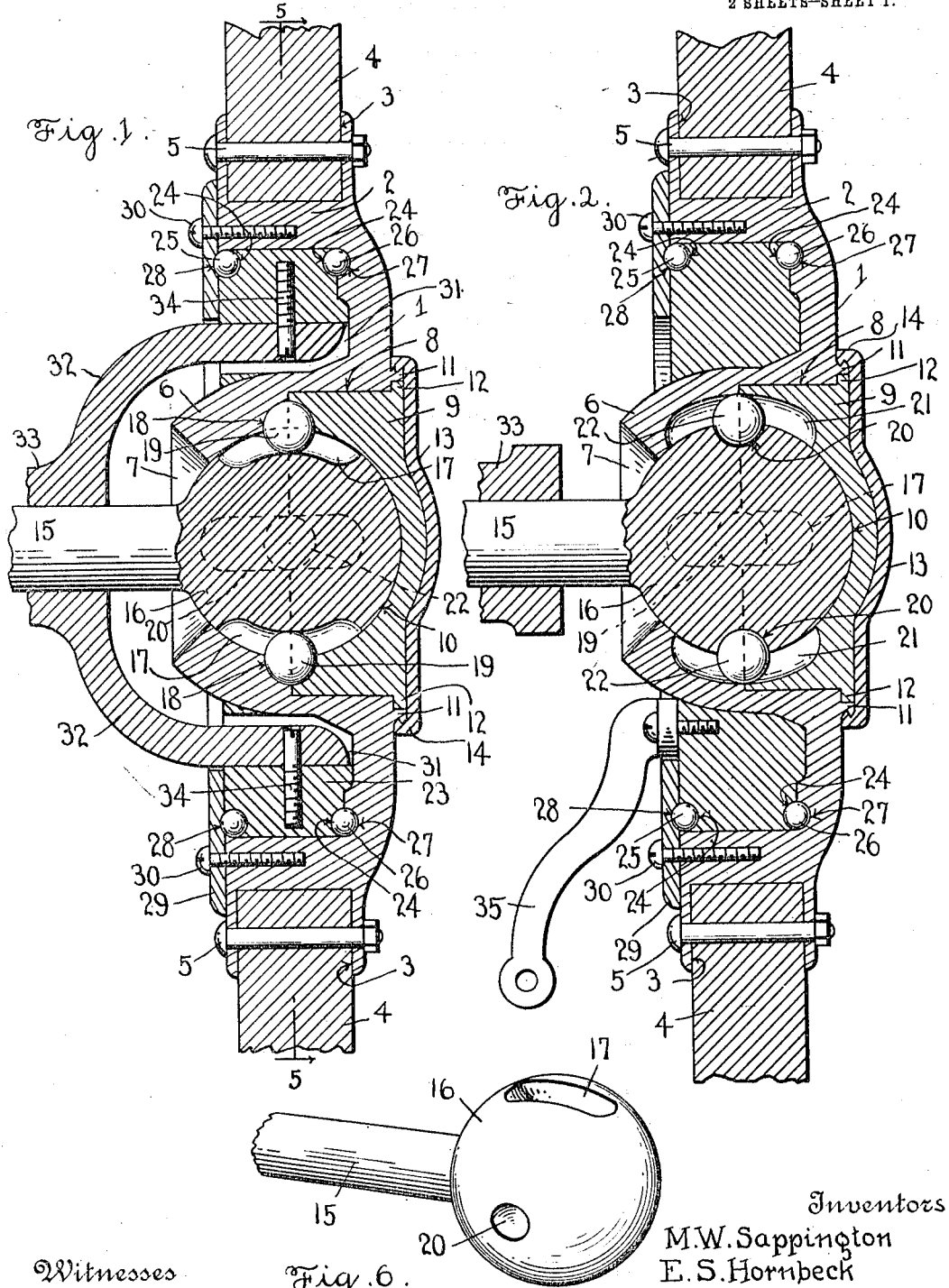

UNITED STATES PATENT OFFICE.

MERRICK W. SAPPINGTON AND EDWARD S. HORNBECK, OF WINCHESTER, ILLINOIS.

FRONT DRIVING AND STEERING MECHANISM FOR MOTOR-VEHICLES.

1,048,213.  Specification of Letters Patent.  Patented Dec. 24, 1912.

Application filed December 14, 1911. Serial No. 665,707.

*To all whom it may concern:*

Be it known that we, MERRICK W. SAPPINGTON and EDWARD S. HORNBECK, citizens of the United States, residing at Winchester, in the county of Scott and State of Illinois, have invented certain new and useful Improvements in Front Driving and Steering Mechanism for Motor-Vehicles; and we do declare the following to be a full, clear, and exact description of the invention, such as will enable others skilled in the art to which it appertains to make and use the same.

This invention relates to improvements in front driving and steering mechanism for motor vehicles.

One object of the invention is to improve the construction and operation of the mechanism shown in United States Patent No. 990,073 granted to us April 18, 1911, whereby a stronger, more durable and efficient driving and steering mechanism is provided.

Another object is to simplify the construction shown in the above named patent whereby the expense of manufacturing the same will be greatly reduced.

With these and other objects in view the invention consists of certain novel features of construction, and the combination and arrangement of parts as will be more fully described and claimed.

In the accompanying drawings; Figure 1 is a central vertical sectional view of a portion of the axle and front wheel of a motor vehicle embodying our invention; Fig. 2 is a central horizontal section of the same; Fig. 3 is a cross sectional view through the axle showing an inner side view of the hub of the wheel; Fig. 4 is an outer side view of the same; Fig. 5 is a vertical sectional view taken on the line 5—5 of Fig. 1. Fig. 6 is a detail view of the end of the axle and the spherical head thereon.

Our improved driving mechanism comprises a hub consisting of a main inner member 1, comprising a plate having on its outer edge a lateral inwardly extending flange 2 in which are formed spoke sockets 3 in which are engaged the spokes 4 of the wheel, said spokes being secured in the sockets by bolts 5 as shown. On the inner portion of the plate 1 is formed an inwardly extending bearing sleeve 6 in the inner end of which is formed a shaft opening 7 the edges of which are flared outwardly as shown to permit the hub to freely turn on the axle. In the outer portion of the sleeve 6 and front side of the plate 1 is formed a cylindrical recess 8 with which is engaged the central member 9 of the hub, said member being in the form of a cylindrical block having in its inner side a hemispherical shaped bearing seat 10 which forms a continuation of the inner wall of the sleeve 6 and together therewith forms a substantially spherical shaped ball socket in the center of the hub.

On the outer side of the main member or plate of the hub around the outer edge of the recess 8 therein and spaced a suitable distance from said edge is an annular outwardly extending flange 11, the outer side of which is threaded. On the outer edge of the central member 9 of the hub is formed a radially projecting annular flange 12 which fits into the annular space between the flange 11 and the wall of the recess 8 as clearly shown in Figs. 1 and 2 of the drawing. When thus arranged the central member 9 of the hub is secured by a circular cap plate 13 having an interiorly threaded annular flange 14 on its outer edge which is adapted to engage the threaded flange 11 on the main portion of the hub.

The hub when thus constructed is revolubly engaged with an axle 15 having on its ends spherical heads 16, one of which is shown in the present instance, said head being engaged with the ball socket formed in the sections of the hub as hereinbefore described. In the outer side of the head at diametrically opposite points are formed segmental grooves or recesses 17 disposed longitudinally or in the same plane as the axle as shown. In the adjacent surfaces of the inner wall of the sleeve 6 and the hemispherical shaped recess 10 in the central portion 9 of the hub are formed hemispherical shaped recesses 18 in which are seated bearing balls 19. At right angles to the recesses 17 and at diametrically opposite points in the head 16 are formed hemispherical shaped notches or recesses 20 which register with segmental grooves or recesses 21 formed in the adjacent inner wall of the sleeve 6 and the hemispherical shaped recess 10 of the hub member 9. With the recesses 20 and segmental grooves 21 are engaged bearing balls 22. By thus arranging the balls 19 and 22 and the recesses in the head of the axle and adjacent parts of the hub, the latter is securely locked against circumferential movement on the axle but is free to swing thereon in a horizontal plane thus permitting the axle to drive the hub and wheel, at the same time permitting said wheel to be turned for steering the vehicle in the desired direction.

Engaged with the rear side of the plate or main member 1 of the hub between the flange 2 and the sleeve 6 is an annular bearing plate or ring 23 in the inner and outer sides of which, adjacent to its outer edge are formed annular ball races 24 with which are engaged annular series of bearing balls 25 and 26, said balls 25 also engaging an annular ball race 27 formed in the adjacent surface of the plate or main member 1 of the hub, while the balls 26 also engage an annular ball race 28 formed in an annular retaining plate or ring 29 which is secured to the rear side of the main member 1 of the hub by screws 30 or other suitable fastening devices, said plate having its inner portion projecting inwardly over the outer portion of the bearing ring 23 as shown.

In the bearing ring 23 at diametrically opposite points above and below the center of the axle are formed elongated slots 31 with which are engaged the outer ends of curved hub attaching arms 32 formed on the outer end of the sleeve or stationary portion 33 of the axle in which the revoluble portion 15 of the axle is mounted. The ends of the arms 32 are pivotally secured in the slots 31 of the annular plate or ring 23 by pivot screws 34 arranged through the arms 32 and having a screw threaded engagement with the ring or plate 23 as clearly shown in Fig. 1 of the drawings. To the rear side of the annular plate or ring 23 between the inner edge of the plate 29 and the socket 6 is a crank arm 35 to which is adapted to be connected the usual or any suitable form of steering rod not shown. By thus arranging the crank arm 35 the wheel may be turned to the right or to the left for the purpose of steering the vehicle without interfering in any manner with the driving mechanism of the wheel.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described our invention, what we claim is;

In a front driving and steering mechanism for motor vehicles, a hub comprising a main member having thereon a centrally disposed inwardly projecting bearing sleeve having a partial ball seat therein, an annular inwardly extending flange formed on the outer edge of said member, a central hub member removably engaged with the outer end of the sleeve in said main member, said central hub member having formed therein a seat adapted to form with the partial seat in the main member, a ball socket, a cap engaged with said main member and adapted to hold said central member in operative position, an axle, a spherical head formed on the end thereof and adapted to engage the socket formed by the seats in said hub members, means to lock said hub members against circumferential movement on the head and to permit said hub to swing laterally in a horizontal plane, an annular bearing plate arranged in said outer member of the hub and having a ball bearing engagement with the annular flange thereon whereby said hub is revolubly supported, said plate having therein oppositely disposed slots, a stationary sleeve arranged on said axle, arms formed on the end of said sleeves and having their ends projecting into the slots in said bearing plate, means to pivotally connect the ends of said arms to said plate, whereby the latter and the hub are permitted to swing laterally in a horizontal plane, and a steering arm secured to said bearing plate.

In testimony whereof we have hereunto set our hands in presence of two subscribing witnesses.

MERRICK W. SAPPINGTON.
EDWARD S. HORNBECK.

Witnesses:
R. O. RENNER,
C. J. HAWKINS.